(12) United States Patent
Hou

(10) Patent No.: US 8,571,837 B1
(45) Date of Patent: Oct. 29, 2013

(54) SYSTEM AND METHOD FOR SIMULATING A BI-DIRECTIONAL CONNECT MODULE WITHIN AN ANALOG AND MIXED-SIGNAL CIRCUIT

(75) Inventor: Junwei Hou, Mountain View, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 607 days.

(21) Appl. No.: 12/838,348

(22) Filed: Jul. 16, 2010

(51) Int. Cl.
*G06F 17/50* (2006.01)

(52) U.S. Cl.
USPC ...... 703/2; 703/12; 703/14; 702/13; 701/106; 327/156

(58) Field of Classification Search
USPC .................. 703/2, 12, 14; 702/13; 701/106; 327/156
See application file for complete search history.

(56) References Cited

U.S. PATENT DOCUMENTS

| 6,157,838 | A * | 12/2000 | Di Huo et al. ............... 455/439 |
| 6,985,842 | B2 | 1/2006 | Grupp et al. |
| 7,227,916 | B2 * | 6/2007 | Ruelke et al. ............... 375/345 |
| 7,523,424 | B2 | 4/2009 | Kolpekwar et al. |
| 7,574,342 | B2 | 8/2009 | Kundert |
| 7,672,827 | B1 | 3/2010 | Schapira et al. |
| 2002/0049576 | A1 * | 4/2002 | Meyer ............................. 703/14 |
| 2007/0146024 | A1 * | 6/2007 | Allan ............................. 327/156 |
| 2007/0244686 | A1 | 10/2007 | Chang et al. |

OTHER PUBLICATIONS

Olaf Zinke, "Bi-Directional Mixed Signal Connection Modules for Automatic Insertion", Behavioral Modeling and Simulation, 2002, BMAS 2002; Proceedings of the 2002 IEEE International Workshop on, vol., No., pp. 102-107, Oct. 6-8, 2002.
Steven S. Leung, "Behavioral Modeling of Transmission Gates in VHDL", Design Automation, 1989, 26th Conference on, vol., No., pp. 746-749, Jun. 25-29, 1989.
Kundert et al., "Mixed-Signal Modeling", Chapter 4, The Designer's Guide to Verilog-AMS, Jun. 2004, springer US, pp. 99-148.

* cited by examiner

*Primary Examiner* — Thai Phan
(74) *Attorney, Agent, or Firm* — Kenyon & Kenyon LLP

(57) ABSTRACT

According to some embodiments, a method is provided for simulating an analog and mixed-signal circuit design comprising an analog circuit segment connected to a digital circuit segment at a connection point, the method comprising: inserting a bi-directional interface element at the connection point, wherein the analog circuit segment connects to an analog port of the bi-directional interface element and the digital circuit segment connects to a digital port of the bi-directional interface element; and operating the bi-directional interface element such that the bi-directional interface element detects a signal direction and, according to the signal direction, either converts a first analog signal received from the analog port to a first digital signal for the digital port while maintaining a first signal strength of the first analog signal, or converts a second digital signal received from the digital port to a second analog signal for the analog port while maintaining a second signal strength of the second digital signal.

20 Claims, 4 Drawing Sheets

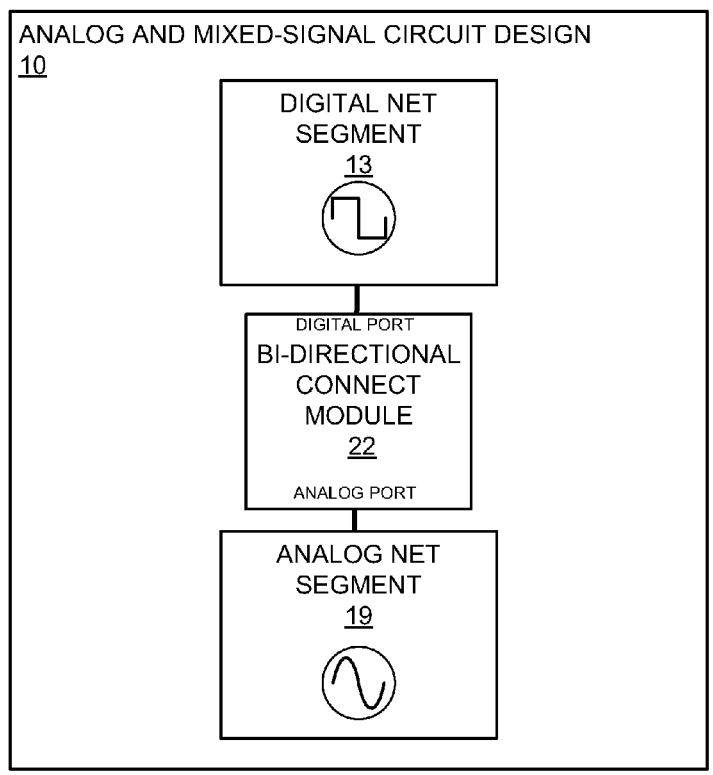
FIG. 1
(PRIOR ART)
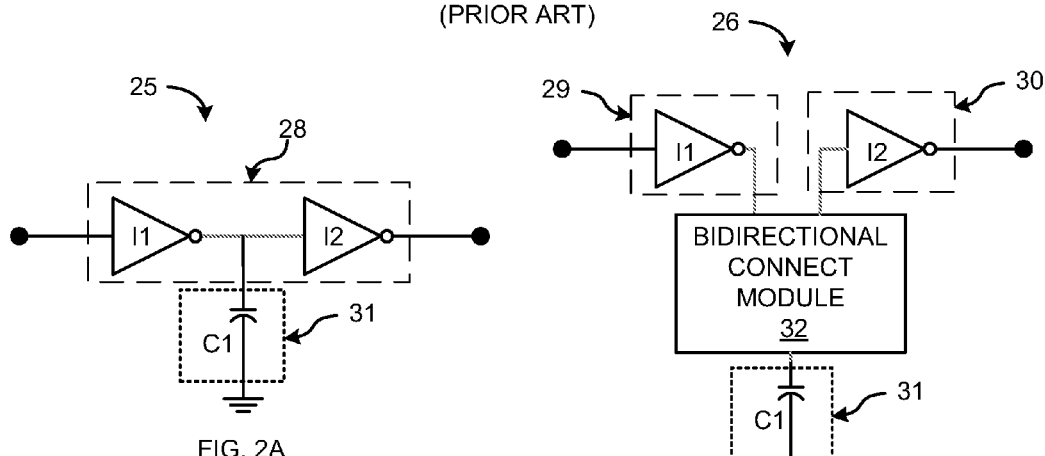
FIG. 2A
(PRIOR ART)
FIG. 2B
(PRIOR ART)

SYSTEM AND METHOD FOR SIMULATING A BI-DIRECTIONAL CONNECT MODULE WITHIN AN ANALOG AND MIXED-SIGNAL CIRCUIT

RELATED APPLICATION

This present application claims priority from U.S. provisional application Ser. No. 61/275,712, filed Jun. 29, 2010, which is incorporated herein by reference. The present application is related to co-pending U.S. application Ser. No. 12/821,030 filed Jun. 22, 2010 entitled "System and Method for Simulating a Transmission Gate Network and a Bi-Directional Connect Module Within an Analog and Mixed-Signal Circuit."

FIELD OF THE INVENTION

The present invention relates to circuit designs, and more particularly, simulating mixed-signal circuit designs, including a bi-directional connect module.

DESCRIPTION OF THE RELATED ART

In order to develop, simulate and test analog and mixed-signal circuit designs, those in the semiconductor and electronic design industry utilize analog-mixed signal extensions (AMS) to such hardware descriptor languages (HDLs) as Verilog and VHDL to describe and define the behavior the behavior of the circuit design—Verilog-AMS for Verilog and VHDL-AMS for VHDL. The language extensions not only provide the ability to model the behavior of analog circuitry and digital circuitry, but also allow integration of existing digital designs with analog designs without the need to rewrite the individual designs. For example, Verilog-AMS handles a cross domain connection within a mixed-signal circuit design (e.g., connections between an analog net segment and a digital net segment) by automatically or manually inserting a connect module at the connection point. By doing so, the analog net and digital net are effectively partitioned, allowing each net to be simulated in its respective domain— the analog net in the continuous domain, and the digital net in the discrete domain. Typically, nets in the continuous domain are simulated using a differential equation kernel that calculates at discrete points in time solutions to a set of differential equations. Nets in the discrete domain, on the other hand, are simulated using a discrete event kernel that calculates discrete signal behavior based on events at discrete points in time. Meanwhile, the connect module, usually comprising an analog port connected to the analog net and a digital port connected to the digital net, is charged with converting signals crossing between the two nets. Specifically, the connect module converts the digital logic value from the digital net to an analog voltage for the analog net, or converts an analog voltage from the analog net to a digital logic value for the digital net.

In some cases, a special connect module called a bi-directional (e.g., BiDir) connect module is utilized to connect an analog net and a digital net together at a bi-directional connection point. For example, a bi-directional connect module would be used to connect an analog net to a digital net comprising a bi-directional devices or models, such as a switch or a transmission gate. As the name suggests, a bi-directional connect module is capable of converting cross domain signals (e.g., analog voltage to digital logic value, digital logic value to analog voltage) regardless of the direction in which they pass e.g., from the digital net to the analog net, or vice versa).

FIG. 1 illustrates just such a configuration, where analog and mixed-signal circuit design 10 utilizes a bi-directional connect module 22 to connect a digital net segment 13 with an analog net segment 19. As illustrated, the bi-directional connect module 22 not only connects the digital net 13 and analog net 19, but also provides segregation of the net segments for simulation purposes. The bi-directional connect module may be further configured to convert in both directions simultaneously at any specific time during simulation.

Conventionally, in order for a bi-directional connect module to properly account for the influences of an analog net on a digital net, a bi-directional connect module connecting the two nets would implement the concept of driver-receiver segregation (DRS) during mixed-signal simulation. Essentially, during simulation of the analog and mixed-signal circuit design using the driver-receiver segregation, ordinary drivers and ordinary receivers of a digital network (or digital net) connected to the digital port of a bi-directional connect module are segregated into two net segments with no direct link between them. One segment is (a) a driver net segment (e.g., driver digital network) connected to digital input port of the bi-directional connect module and comprising the ordinary drivers of the digital network; the other segment is (b) a receiver net segment (e.g., receiver digital network) connected to the digital output port of the bi-directional connect module and comprising the ordinary receivers of the digital network. By doing so, the bi-directional connect module during mixed-signal simulation can control the link between the driver net segment and receiver net segment such that the contributions of the analog net can be properly and accurately accounted for in the behavior of the digital net. FIGS. 2A and 2B illustrate how driver-receiver segregation is typically utilized in simulation of an example analog and mixed-signal circuit.

FIG. 2A illustrates an example analog and mixed-signal circuit 25 comprising two inverters (I1 and I2) modeled in the digital (e.g., discrete) domain, and a capacitor modeled in the analog (e.g., continuous) domain. The two inverters comprise digital net segment 28, while the capacitor comprises analog net segment 31. Typically, during simulation, a connect module would be inserted between segment 28 and segment 31, thereby partitioning the two circuit segments and allowing them to be simulated in their respective domains. However, without the use of driver-receiver segregation, as described above, the simulation of the circuit will produce an unexpected and incorrect result. In this specific instance, because the inverters are modeled in the digital domain, and know nothing about the presence of the analog domain due to the net segregation, the digital simulation kernel will propagate a signal from the first inverter I1 to the second inverter I2 without accounting for the signal delay induced by the presence of capacitor C1.

FIG. 2B illustrates example analog and mixed-signal circuit 25 after insertion of a bi-directional connect module 32 between digital net segment 28 and analog net segment 31, and driver-receiver segregation (DRS) of the digit net segment 28 into a driver net 29 comprising only I1, and a receiver net 30 comprising only I2. As depicted, the driver net 29 is connected to the digital input port of module 32, while receiver net 30 is connected to the digital output port of module 32. By doing so, the connect module 32 is able to propagate the signal from the driver net 29 to the receiver net 30 with the delay attributed from analog net 31. It should be noted that conventionally, during analog and mixed-signal simulation (even under driver-receiver segregation) (a) the bi-directional connect module performs digital and analog signal resolution (e.g., cross-domain signal conversion)

between the analog circuit segment and the digital circuit segment; and (b) the transmission gate network remains unaware of the existence of the one or more bi-directional connect modules connected to it.

For mixed-signal simulations, the alternative to using a bi-directional mixed-signal interface element (IE) (e.g., bi-directional connect module) would be to manually define the direction of the signal flow for every connection. This is the case for SpectreVerilog, where once the direction of signal flow has been properly defined, the simulation can insert digital-to-analog and analog-to-digital interface elements (IE's) accordingly.

Unfortunately, neither conventional bi-directional connect modules, nor manually defining the direction of signal flows, are adequate for mixed-signal simulations when the design comprises bi-directional connection points. With respect to conventional bi-directional connect modules, which are based on driver-receiver segregation (DRS), the simulation cannot perform accurate chip-level verification when an analog net is connected to a digital net through a conventional bi-directional connect module because driver-receiver segregation (a) functionally verifies a mixed-signal circuit design through simulation of the analog loading effect on digital receivers of the digital net, (b) but does so under the assumption that the circuit design does not contain bi-directional connection points (e.g., bi-directional connect modules).

Likewise, manually defining the direction of signal flows at bi-directional connections point also fails to adequately simulate mixed-signal circuit designs having such connection points because it cannot fully verify the circuit design when the signal is dynamically bi-directional. Furthermore, in existing mixed-signal circuit design simulations, the interlace element (IE) fails to accurately reflect the signal strength from the analog driver, which can lead to additional erroneous simulation results, especially when the digital net is connected to multiple analog drivers.

BRIEF SUMMARY OF EMBODIMENTS OF THE INVENTION

The present invention provides systems and methods for simulating an analog and mixed-signal circuit design comprising an analog circuit segment connected to a digital circuit segment through a bi-directional connection module/interface device, whereby the bi-directional connection module simulates the connection between the two segments accurately, whether it is a unidirectional connection or a bidirectional connection. According to various embodiments of the present invention, the bi-directional connection module can detect signal direction (analog-to-digital or digital-to-analog) dynamically, and convert signals appropriately. Additionally, embodiments of the present invention accurately model the signal strength of drivers on both the analog circuit segment and the digital circuit segment.

For example, in one embodiment, a method is provided for simulating an analog and mixed-signal circuit design comprising an analog circuit segment connected to a digital circuit segment at a connection point, the method comprising: using a computer system to insert a bi-directional interface element at the connection point, wherein the analog circuit segment connects to an analog port of the bi-directional face element and the digital circuit segment connects to a digital port of the bi-directional interface element; and the bi-directional interface element detecting a signal direction and, according to the signal direction, either converting a first analog signal received from the analog port to a first digital signal for the digital port while maintaining a first signal strength of the first analog signal, or converting a second digital signal received from the digital port to a second analog signal for the analog port while maintaining a second signal strength of the second digital signal. In some embodiments, when the bi-directional interface element is inserted at the connection point, the digital circuit segment is preserved as a single segment.

For particular embodiments, the conversion of the first analog signal to the first digital signal comprises: determining an impedance of the analog circuit segment at the analog port; converting the first analog signal from a voltage value to a logic value, thereby resulting in the first digital signal; adjusting the first signal strength of the first digital signal according to the impedance of the analog circuit segment; and outputting the first digital signal through the digital port. For other embodiments, the conversion of the second digital signal to the second analog signal comprises: determining the second signal strength of the second digital signal by resolving a signal strength of a digital driver of the digital circuit segment; converting the second digital signal from a logic value to a voltage value by resolving a signal value of the digital drive of the digital circuit segment; and outputting through the analog port the second analog signal according to the voltage value and the second signal strength.

In further embodiments, the method is configured for Verilog-AMS, and the bi-directional connect module is an AMS bidir connect module. In additional embodiments, the first signal strength is defined by a Verilog strength level for the digital port, and the second signal strength is defined by a Verilog strength level for the analog port.

In some embodiments, the analog circuit segment and analog portion (e.g., analog port and bi-directional interface element's components handling the analog port) of the bi-directional interface element are simulated in a continuous time domain circuit simulator. In additional embodiments, the digital circuit segment and digital portion (e.g., digital port and bi-directional interface element's components handling the digital port) of the bi-directional interface element are simulated in a discrete time domain circuit simulator.

In other embodiments, the methods as described above are implemented into a computer aided design tool, such as an electronic design and automation (EDA) tool, or a computer system configured to simulate an analog and mixed-signal circuit design. For example, the computer aided design tool or the computer system may comprise: a processor; and a memory, coupled to the processor and having computer program code embodied therein for enabling the processor to perform operations in accordance with those methods described herein. Alternative embodiments in accordance with above provide for a computer program product comprising a computer useable storage medium having computer program code embodied therein for simulating an analog and mixed-signal circuit design comprising an analog circuit segment and a digital circuit segment in accordance with aspects of the invention described herein.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 1 illustrates an example analog and mixed-signal circuit design utilizing a bi-directional connect module to connect a digital net segment with an analog net segment.

FIGS. 2A and 2B illustrate an example analog and mixed-signal circuit design before and after driver-receiver segregation.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention provides systems and methods for simulating an analog and mixed-signal circuit design comprising an analog circuit segment connected to a digital circuit segment through a bi-directional interface element (also referred to as a bi-directional connect module), whereby the bi-directional connection module simulates the connection between the two segments accurately, whether it is a unidirectional connection or a bidirectional connection. According to various embodiments of the present invention, the bi-directional interface element can detect signal direction (analog-to-digital or digital-to-analog) dynamically, and convert signals appropriately. Additionally, embodiments of the present invention accurately model the signal strength of drivers on both the analog circuit segment and the digital circuit segment.

It should be appreciated that an analog circuit segment as used herein includes both circuits comprising analog components (e.g., resistors, capacitors, inductors, etc.), and circuits based on the transistor level models that are simulated in the continuous-time domain. Further, a digital circuit segment, as used herein includes a circuit described by a hardware descriptor language, such as, for example, Verilog or VHDL, and simulated in the discrete time domain.

In general, according to embodiments of the present invention, a bi-directional interface element is inserted between an analog circuit segment and a digital circuit segment, such that the analog port of the bi-directional interface element is connected to the analog circuit segment and the digital port of the bi-directional interface element is connected to the digital circuit segment. However unlike conventional mix-signal circuit simulations that use driver-receiver segregation (DRS), the digital drivers and digital receivers of the digital circuit segment remained unchanged, and maintained as one digital circuit segment. In other words, the bi-directional interface element is connected natively the digital circuit segment, as defined by a circuits netlist.

In some embodiments, such as those implemented using a hardware descriptor language like Verilog-AMS, a chip-level interface element insertion rule can be utilized to insert a bi-directional interface element between an analog circuit segment and a digital circuit segment. In order for the bi-directional interface element to detect signal direction (analog-to-digital or digital-to-analog) dynamically, and convert signals appropriately, some embodiments are configured with built-in functions to detect the signal direction dynamically.

Figure 3:
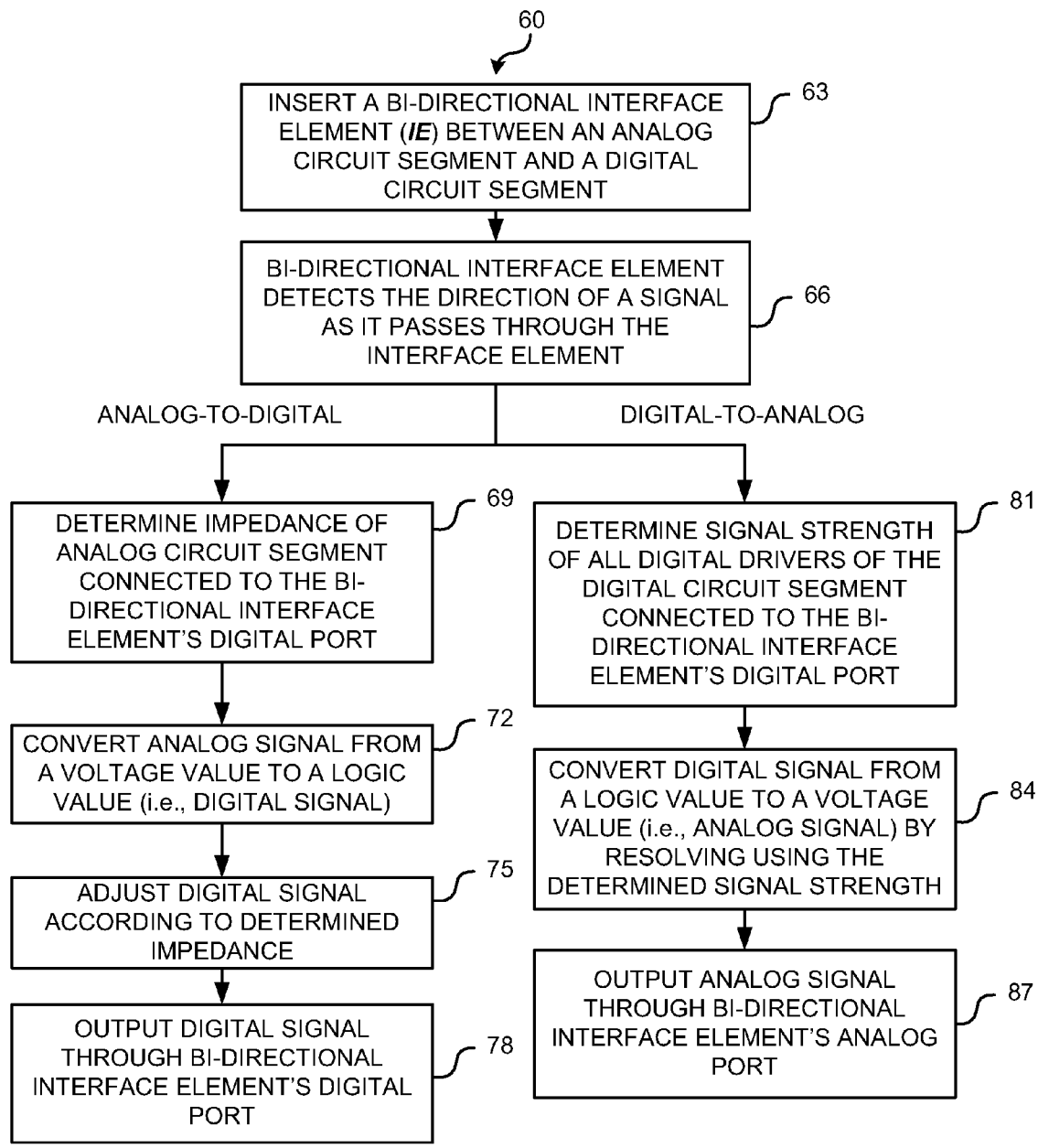
FIG. 3 illustrates a flowchart of an example method in accordance with one embodiment of the invention.

FIG. 3 illustrates a flowchart of an example method 60 of inserting and operating a bi-directional interface element in accordance with one embodiment of the invention. Referring now to FIG. 3, at operation 63, a bi-directional interface element is inserted between an analog circuit segment and a digital circuit element. In addition to connecting an analog net to a digital net, the bi-directional interface element is configured to convert signals from the analog domain to the digital domain, and vice versa. The bi-directional interface element is further configured to maintain signal strength during a conversion process, especially when the conversion process involves converting a signal from an analog driver and to be outputted to a digital receiver.

In operation 66, the bi-directional interface element detects the direction of a signal as it passes from one circuit segment (e.g., analog circuit segment) to another circuit segment (e.g., digital circuit segment). When the signal is being sent from an analog driver to a digital receiver through the bi-directional interface element (e.g., a analog-to-digital conversion), the bi-directional interface element, at operation 69, determines the impedance of the analog circuit segment connected to its analog port. Next, the bi-directional interface element converts the analog signal, which is a voltage value, to a logic value relevant in the digital domain, thereby resulting in a digital signal. To accurately convey the signal strength with which the analog circuit segment is driving its signal, at operation 75 the bi-directional interface element adjusts the digital signal according to the impedance previously determined at operation 69. This adjusted digital signal is then outputted through the digital port of the bi-directional interface element at operation 78.

Alternatively, when the signal is being sent from a digital driver to an analog receiver through the bi-directional interface element (e.g., a digital-to-analog conversion), the bi-directional interface element, at operation 81, determines the signal strength of all digital drivers within the digital circuit segment connected to the digital port of the bi-directional interface element, and converts the strength to the Thevenin resistance of the equivalent circuit for the digital drivers. Method 60 continues with operation 84 where the bi-directional interface element converts the digital signal from its logic value to the Thevenin equivalent voltage of the equivalent circuit for the digital drivers. This analog signal of the equivalent circuit, which reflects the signal strength and value of all the digital drivers connected to the digital port of the bi-directional interface element, is then outputted through the analog port at operation 87.

Figure 4:
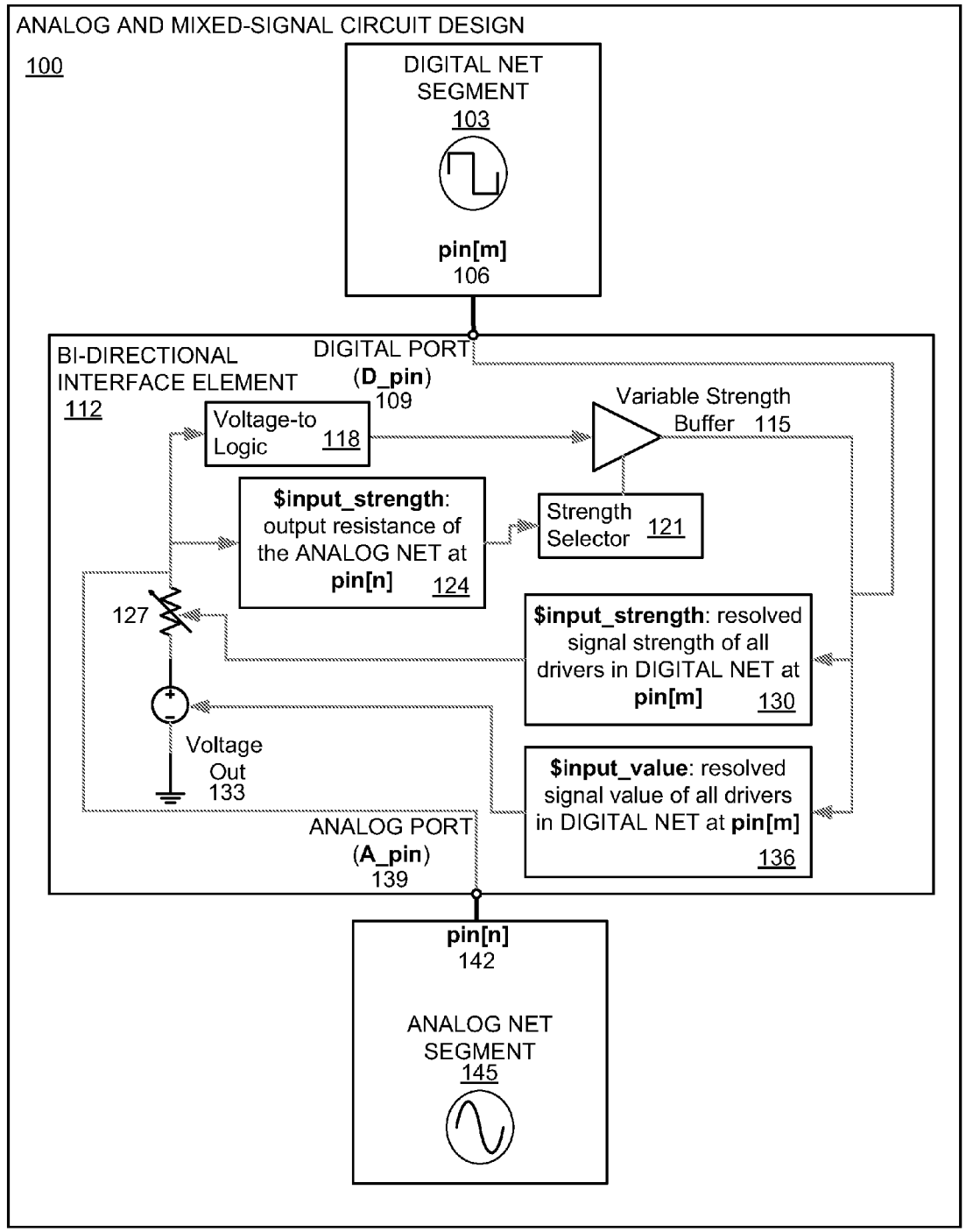
FIG. 4 illustrates an analog and mixed-signal circuit design using a bi-directional connect module in accordance with one embodiment of the invention.

FIG. 4 illustrates an analog and mixed-signal circuit design 100 using a bi-directional interface element 112 in accordance with one embodiment of the invention. As illustrated in the diagram, digital net segment 103, comprising pin[m] 106, is connected to analog net segment 145, comprising pin[n] 142, through bi-directional interface element 112, comprising digital port D_pin 109 connected to pin[m] 106, and analog port A_pin 139 connected to pin[n] 142. The bi-directional interface element 112 is specifically configured to dynamically convert signals from one domain to another while maintaining signal strength.

According to the illustrated embodiment, bi-directional interface element 112 converts an analog signal from analog port A_pin 139 to a digital signal for digital port D_pin 109 by receiving an analog signal from analog port A_pin 139 at voltage-to-logic converter module 118. Voltage-to-logic converter module 118 receives the analog signal and converts it to a resulting logic value (e.g., digital signal), which is then outputted to variable strength buffer 115 for signal strength adjustment. Thereafter, variable strength buffer 115, which is driven by digital register strength selector 121, adjusts the strength of the digital signal received according to the value defined in the strength selector 121. In order to facilitate the adjustment, in some embodiments the variable strength buffer 115 is implemented as a tri-state signal buffer. Eventually, the adjusted digital signal that results from variable strength buffer 115 is outputted to the digital receivers of the digital net segment 103 through the digital port D_pin 109.

In order to facilitate certain features of present invention, some embodiments incorporate specific system functions into the bi-directional interface element to perform operations in accordance with the invention. For example, in some embodiments, the system functions may include $input_strength, a function used to determine the output resistance/impedance (e.g., strength of signal) of a net (e.g., circuit segment) connected to a specific port of a bi-directional interface element while excluding the contribution of the interface element itself. The system functions may also include $input_value, a function used to determine a logic value provided by a digital net connected to a specific port a bi-directional interface element.

Continuing with reference to the illustrated embodiment, module 124 of bi-directional interface element 112 specifically utilizes system function $input_strength to determine the value of strength selector 121. Specifically, module 124 employs system function $input_strength on analog port A_pin 139 to determine the output resistance (e.g., impedance) of the analog net segment 145 (e.g., executes $input_strength(A_pin)). The execution of $input_strength (A_pin) returns the impedance seen by bi-directional interface element 112 at analog port A_pin while excluding the contribution of the interface element itself. Module 124 uses the determined impedance to set the value of strength selector 121. As previously described, variable strength buffer 115 then uses the value of strength selector 121 to adjust the digital signal outputted by voltage-to-logic converter 118, which outputs the resulting digital signal through D_pin 109. It should be noted that under circuit theory, the output resistance of the analog net segment 145 is also called the Thevenin resistance of the equivalent circuit representing for the analog net segment 145.

With respect to converting a digital signal from digital port D_pin 109 to an analog signal for analog port A_pin 139, after a digital signal is received by module 136 from digital port D_pin 109, module 136 determines the signal value being received from all the digital drivers of the digital net segment 106 connected to digital port D_pin 109. In the illustrated embodiment, module 136 specifically utilizes system function $input_value to accomplish this (e.g., executes $input_value(D_pin), which returns the voltage value provided by the digital drivers connected to the digital port (i.e., D_pin). Module 130 on the other hand, specifically utilizes system function $input_strength to resolve the signal strength of all digital drivers of the digital net segment 106 that are connected to the digital port D_pin 109 (e.g., executes $input_strength(D_pin), which returns the signal strength of the digital drivers seen by bi-directional interface element 112 at analog port D_pin while excluding the contribution of the interface element itself).

For the illustrated embodiment, in order to complete the analog-to-digital conversion and output the resulting analog signal through analog port A_pin 139, bi-directional interface element 112 further comprises the equivalent circuit representation for the digital drivers with a Thevenin resistor 127 and a Thevenin voltage source 133 connected between the analog port A_pin 139 and ground. The voltage value determined by module 136 controls this Thevenin voltage source 133, while the strength value determined by module 130 controls the Thevenin resistor 127.

It should be noted that for embodiments implemented using Verilog-AMS, the conversion between output resistance of a port and a driving signal strength of a port can be defined using standard Verilog definitions. For example, the following are Verilog strength levels as defined by the Institute of Electrical and Electronics Engineers (IEEE).

| Strength name | Strength level |
|---|---|
| supply | 7 |
| strong | 6 |
| pull | 5 |
| large | 4 |
| weak | 3 |
| medium | 2 |
| small | 1 |
| highz | 0 |

By using these foregoing definitions, a conversion between the port output resistance and a driving signal strength at that same port may be designated as follows:

| Strength name | Strength level | resistance |
|---|---|---|
| supply | 7 | 1 |
| strong | 6 | 1e1 |
| pull | 5 | 1e2 |
| large | 4 | 1e3 |
| weak | 3 | 1e4 |
| medium | 2 | 1e5 |
| small | 1 | 1e6 |
| highz | 0 | 1e7 |

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 5:
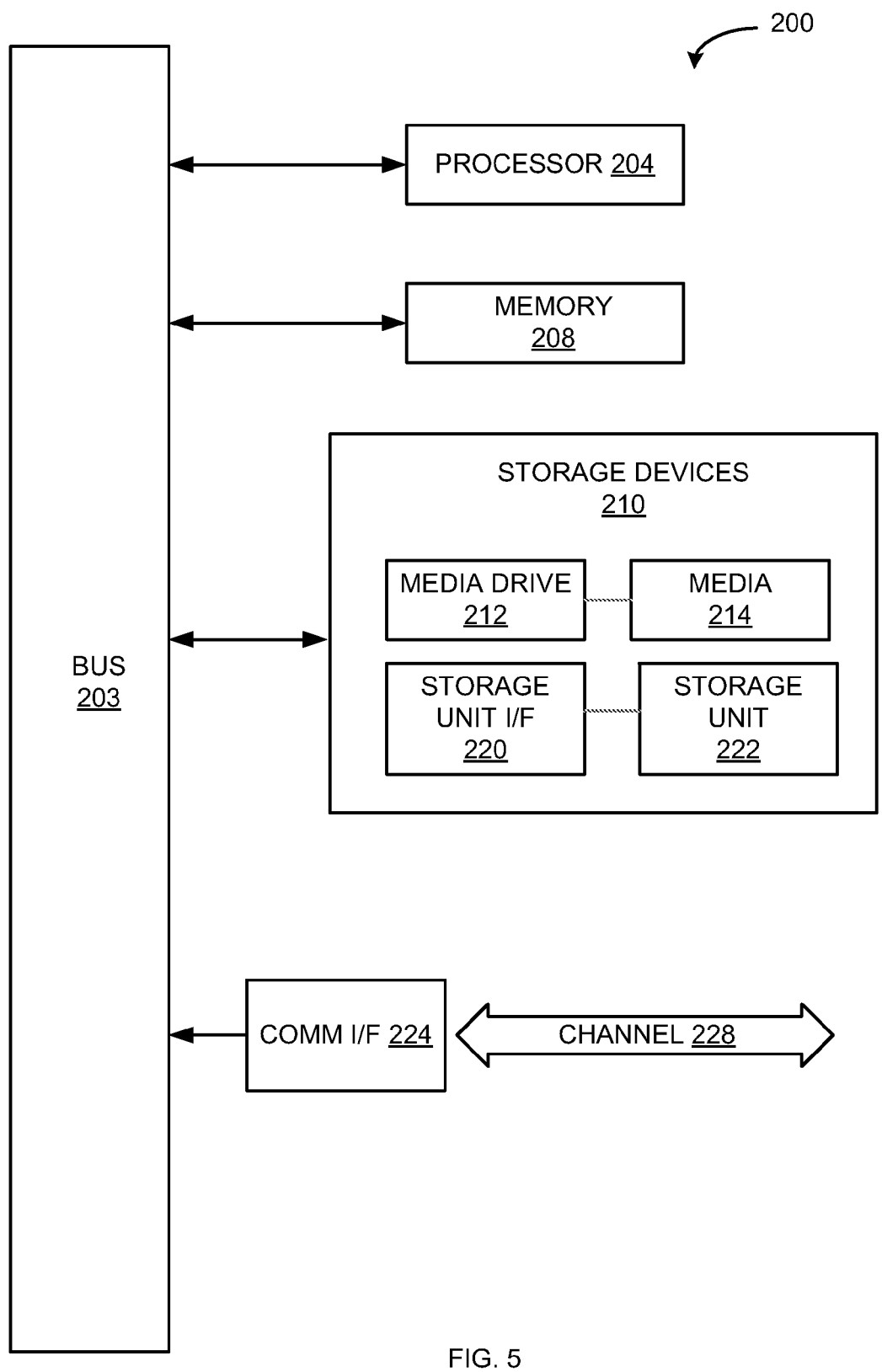
FIG. 5 illustrates an example computing module for implementing various embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers. ASICs, PLAs, PALS, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example—computing module 200. After reading this description, it will become apparent to a person skilled in the relevant art how to implement the invention using other computing modules or architectures.

Referring now to FIG. 5, computing module 200 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 200 might also represent computing capabilities embedded within or otherwise available to a given device. For example, a computing module might be found in other electronic devices such as, for example, digital cameras, navigation systems, cellular telehones, portable computing devices, modems, routers, WAPs, terminals and other electronic devices that might include some form of processing capability.

Computing module 200 might include, for example, one or more processors, controllers, control modules, or other processing devices, such as a processor 204. Processor 204 might be implemented using a general-purpose or special-purpose processing engine such as, for example, a microprocessor, controller, or other control logic. In the illustrated example, processor 204 is connected to a bus 202, although any communication medium can be used to facilitate interaction with other components of computing module 200 or to communicate externally.

Computing module 200 might also include one or more memory modules, simply referred to herein as main memory 208. For example, preferably random access memory (RAM) or other dynamic memory, might be used for storing information and instructions to be executed by processor 204. Main memory 208 might also be used for storing temporary variables or other intermediate information during execution of instructions to be executed by processor 204. Computing module 200 might likewise include a read only memory ("ROM") or other static storage device coupled to bus 202 for storing static information and instructions for processor 204.

The computing module 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a floppy disk drive, a magnetic tape drive, an optical disk drive, a CD or DVD drive (R or RW), or other removable or fixed media drive might be provided. Accordingly, storage media 214 might include, for example, a hard disk, a floppy disk, magnetic tape, cartridge, optical disk, a CD or DVD, or other fixed or removable medium that is read by, written to or accessed by media drive 212. As these examples illustrate, the storage media 214 can include a computer usable storage medium having stored therein computer software or data.

In alternative embodiments, information storage mechanism 210 might include other similar instrumentalities for allowing computer programs or other instructions or data to be loaded into computing module 200. Such instrumentalities might include, for example, a fixed or removable storage unit 222 and an interface 220. Examples of such storage units 222 and interfaces 220 can include a program cartridge and cartridge interface, a removable memory (for example, a flash memory or other removable memory module) and memory slot, a PCMCIA slot and card, and other fixed or removable storage units 222 and interfaces 220 that allow software and data to be transferred from the storage unit 222 to computing module 200.

Computing module 200 might also include a communications interface 224. Communications interface 224 might be used to allow software and data to be transferred between computing module 200 and external devices. Examples of communications interface 224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 224 might typically be carried on signals, which can be electronic, electromagnetic (which includes optical) or other signals capable of being exchanged by a given communications interface 224. These signals might be provided to communications interface 224 via a channel 228. This channel 228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 208, storage unit 220, media 214, and channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 200 to perform features functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for simulating an analog and mixed-signal circuit design comprising an analog circuit segment connected to a digital circuit segment at a connection point, the method comprising:

using a computer system to insert a bi-directional interface element at the connection point, wherein the analog circuit segment connects to an analog port of the bi-directional interface element and the digital circuit segment connects to a digital port of the bi-directional interface element; and the bi-directional interface element detecting a signal direction and, according to the signal direction, either converting a first analog signal received from the analog port to a first digital signal for the digital port while maintaining a first signal strength of the first analog signal, or converting a second digital signal received from the digital port to a second analog signal for the analog port while maintaining a second signal strength of the second digital signal.

2. The method of claim 1, wherein if the bi-directional interface element is inserted at the connection point, the digital circuit segment is preserved as a single segment.

3. The method of claim 1, wherein the conversion of the first analog signal to the first digital signal comprises:

determining an impedance of the analog circuit segment at the analog port;

converting the first analog signal from a voltage value to a logic value, thereby resulting in the first digital signal;

adjusting the first signal strength of the first digital signal according to the impedance of the analog circuit segment; and outputting the first digital signal through the digital port.

4. The method of claim 1, wherein the conversion of the second digital signal to the second analog signal comprises:

determining the second signal strength of the second digital signal by resolving a signal strength of a digital driver of the digital circuit segment;

converting the second digital signal from a logic value to a voltage value by resolving a signal value of the digital drive of the digital circuit segment; and outputting through the analog port the second analog voltage value and the second signal strength.

5. The method of claim 1, wherein the method is configured for Verilog-AMS, and the bi-directional interface element is an AMS bidir connect module.

6. The method of claim 1, wherein first signal strength is defined by a Verilog strength level for the digital port, and the second signal strength is defined by a Verilog strength level for the analog port.

7. The method of claim 1, wherein the analog circuit segment and the analog portion of the bi-directional interface element are simulated in a continuous time domain circuit simulator.

8. The method of claim 1, wherein the digital circuit segment and the digital portion of the bi-directional interface element are simulated in a discrete time domain circuit simulator.

9. A computer program product for simulating an analog and mixed-signal circuit design comprising an analog circuit segment connected to a digital circuit segment at a connection point, the computer program product comprising a computer-readable storage medium having computer-readable program code embodied in said medium, the computer-readable program comprising:

inserting a bi-directional interface element at the connection point, wherein the analog circuit segment connects to an analog port of the bi-directional interface element and the digital circuit segment connects to a digital port of the bi-directional interface element; and the bi-directional interface element detecting a signal direction and, according to the signal direction either converting a first analog signal received from the analog port to a first digital signal for the digital port while maintaining a first signal strength of the first analog signal, or converting a second digital signal received from the digital port to a second analog signal for the analog port while maintaining a second signal strength of the second digital signal.

10. The computer program product of claim 9, wherein if the bi-directional interface element is inserted at the connection point, the digital circuit segment is preserved as a single segment.

11. The computer program product of claim 9, wherein the conversion of the first analog signal to the first digital signal comprises:
   determining an impedance of the analog circuit segment at the analog port;
   converting the first analog signal from a voltage value to a logic value, thereby resulting in the first digital signal;
   adjusting the first signal strength of the first digital signal according to the impedance of the analog circuit element; and
   outputting the first digital signal through the digital port.

12. The computer program product of claim 9, wherein the conversion of the second
   digital signal to the second analog signal comprises:
   determining the second signal strength of the second digital signal by resolving a signal strength of a digital driver of the digital circuit segment;
   converting the second digital signal from a logic value to a voltage value by resolving a signal value of the digital drive of the digital circuit segment; and
   outputting through the analog port the second analog signal according to the voltage value and the second signal strength.

13. The computer program product of claim 9, wherein the method is configured for Verilog-AMS, and the bi-directional interface element is an AMS bidir connect module.

14. The computer program product of claim 9, wherein the first signal strength is defined by a Verilog strength level for the digital port, and the second signal strength is defined by a Verilog strength level for the analog port.

15. The computer program product of claim 9, wherein the analog circuit segment and the analog portion of the bi-directional interface element are simulated in a continuous time domain circuit simulator.

16. The computer program product of claim 9, wherein the digital circuit segment and the digital portion of the bi-directional interface element are simulated in a discrete time domain circuit simulator.

17. A computer system configured to simulate an analog and mixed-signal circuit design comprising an analog circuit segment connected to a digital circuit segment at a connection point, comprising:
   a processor;
   a memory connected to the processor; and
   a computer readable medium having instructions embedded therein, the instructions configured to cause the processor to perform the operations of:
   inserting a bi-directional interface element at the connection point, wherein the analog circuit segment connects to an analog port of the bi-directional interface element and the digital circuit segment connects to a digital port of the bi-directional interface element; and
   the bi-directional interface element detecting a signal direction and, according to the signal direction, either converting a first analog signal received from the analog port to a first digital signal for the digital port while maintaining a first signal strength of the first analog signal, or converting a second digital signal received from the digital port to a second analog signal for the analog port while maintaining a second signal strength of the second digital signal.

18. The computer system of claim 17, wherein if the bi-directional interface element is inserted at the connection point, the digital circuit segment is preserved as a single segment.

19. The computer system of claim 17, wherein the conversion of the first analog signal to the first digital signal comprises:
   determining an impedance of the analog circuit segment at the analog port;
   converting the first analog signal from a voltage value to a logic value, thereby resulting in the first digital signal;
   adjusting the first signal strength of the first digital signal according to the impedance of the analog circuit segment; and
   outputting the first digital signal through the digital port.

20. The computer system of claim 17, wherein the conversion of the second digital signal to the second analog signal comprises:
   determining the second signal strength of the second digital signal by resolving a signal strength of a digital driver of the digital circuit segment;
   converting the second digital signal from a logic value to a voltage value by resolving a signal value of the digital drive of the digital circuit segment; and
   outputting through the analog port the second analog signal according to the voltage value and the second signal strength.

* * * * *